G. S. MacLEOD.
BRAKE BLOCK.
APPLICATION FILED APR. 11, 1910.
997,570.
Patented July 11, 1911.
2 SHEETS—SHEET 1.
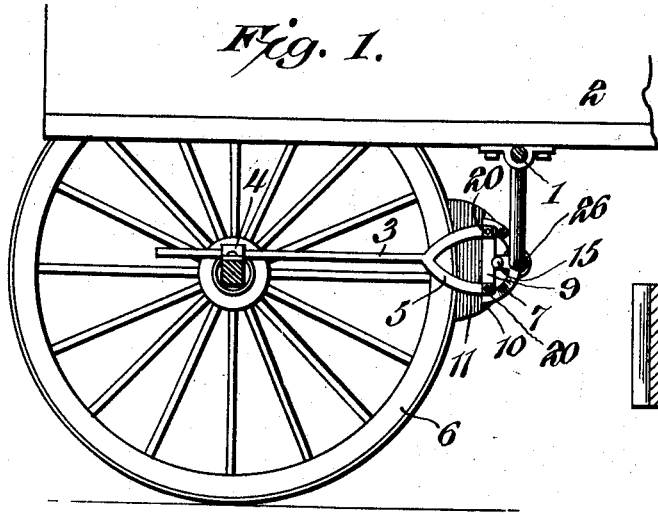
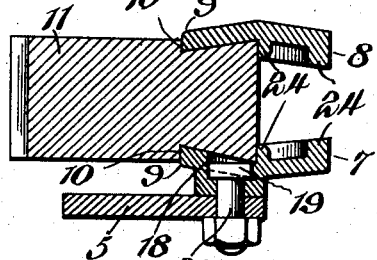
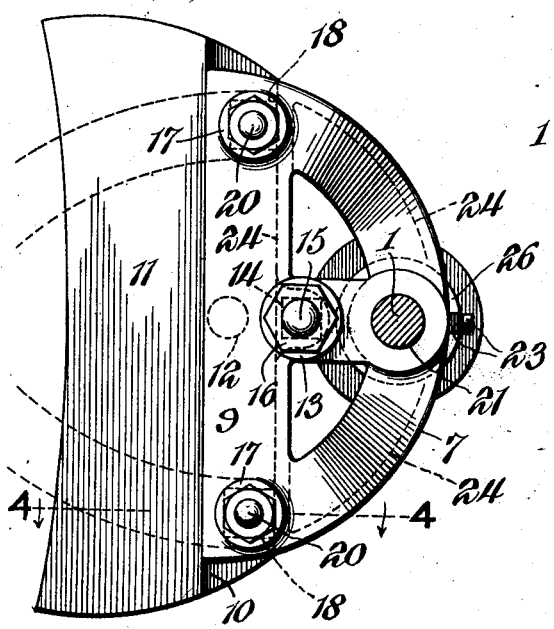
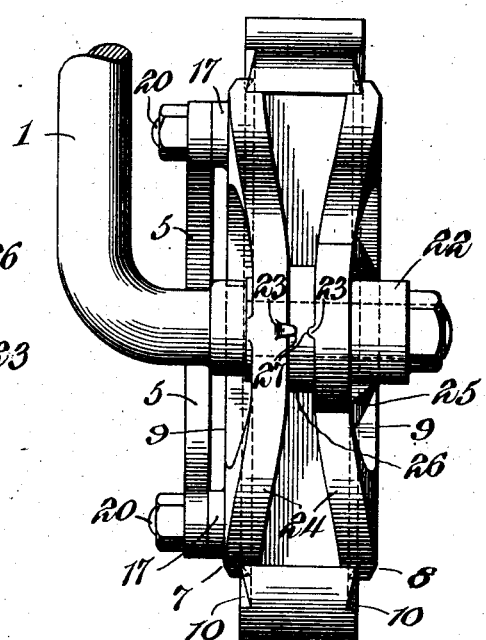
George S. MacLeod, Inventor,
Witnesses
Howard D. Orr.
R. H. Bishop.
By C. G. Siggers.
Attorney

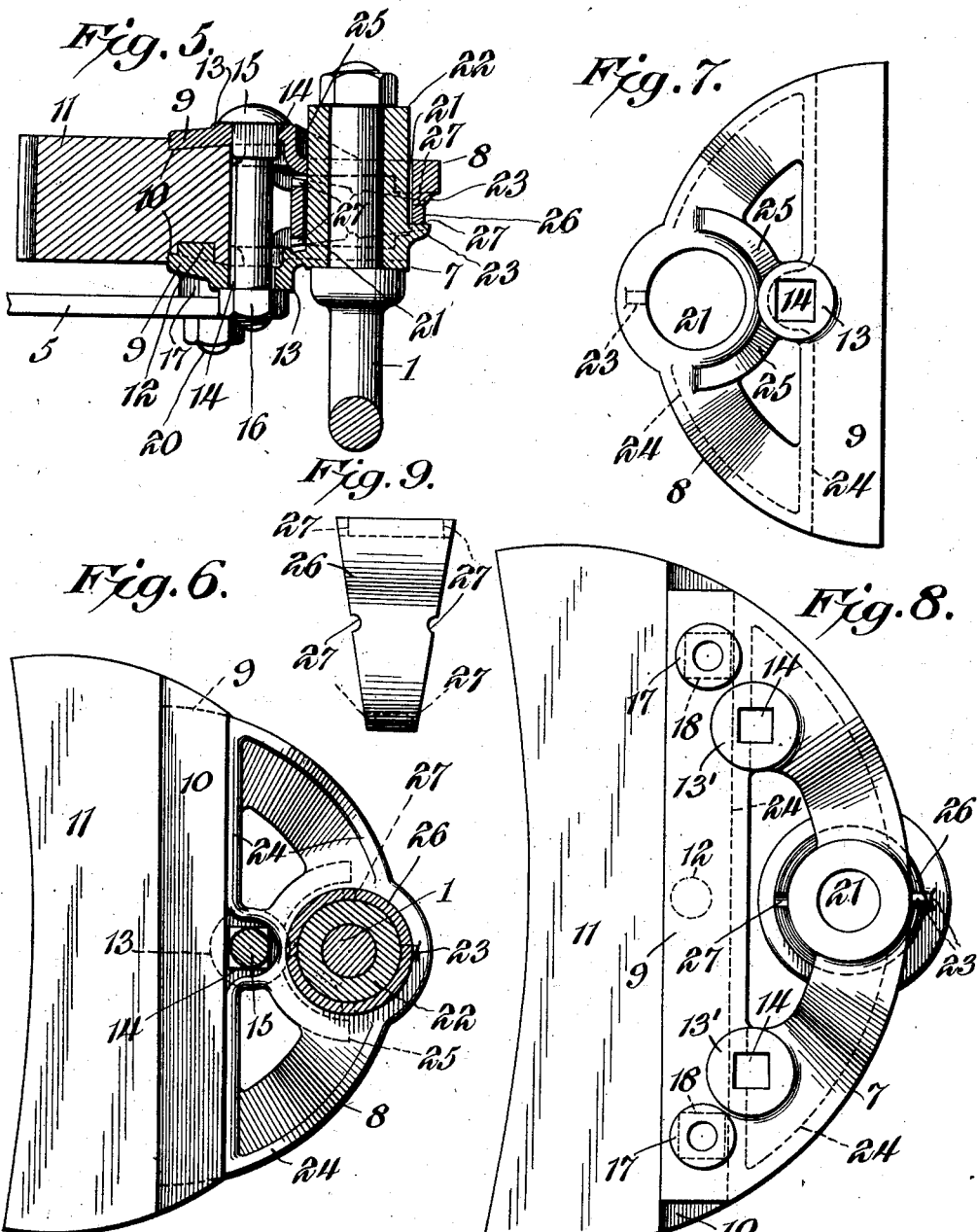

UNITED STATES PATENT OFFICE.

GEORGE STEWARD MacLEOD, OF SEATTLE, WASHINGTON.

BRAKE-BLOCK.

997,570.  Specification of Letters Patent.  Patented July 11, 1911.

Application filed April 11, 1910. Serial No. 554,841.

*To all whom it may concern:*

Be it known that I, GEORGE S. MACLEOD, a subject of the King of Great Britain, residing at Seattle, in the county of King and State of Washington, have invented a new and useful Brake-Block, of which the following is a specification.

This invention relates to improvements in brake blocks and has special reference to that class of brake blocks in which the brake shoe may be removed and a new one substituted without requiring the provision of an entirely new brake block.

One object of my invention is to provide means whereby the brake shoe, when worn out, may be removed and a new one substituted without disturbing the connection of the brake beam or of the brake guide, and a further object of the invention is to provide means whereby the device may be readily fitted to brake shoes of various widths. These objects, and such other incidental objects as will hereinafter appear, are attained by the use of the device illustrated in the accompanying drawings, and the invention consists in certain novel features thereof which will be hereinafter first fully described and then more particularly pointed out in the appended claims.

In the drawings, Figure 1 is an elevation of a portion of a wagon body with one of the carrying wheels, showing my improved brake block applied thereto. Fig. 2 is an elevation of the brake block on a larger scale. Fig. 3 is a front elevation of the same. Fig. 4 is a horizontal section taken on the line 4—4 of Fig. 2. Fig. 5 is a central horizontal section of the brake block. Fig. 6 is a sectional elevation of the brake block, the plane of the section being midway between the two sides of the same. Fig. 7 is a detail elevation of one of the side plates. Fig. 8 is a side elevation showing a slightly modified form of the brake block. Fig. 9 is a detail view of the adjusting ring.

My present improvements are designed more particularly for that class of brakes in which a brake beam 1 is attached to a vehicle body 2, and a guide rod 3 is mounted to slide in an eye 4 on the rear axle, the front end of the guide rod being forked, as shown at 5, and attached to the brake block, the function of the said guide rod being to hold the brake shoe in line with the wheel 6 when the brake is unapplied.

In carrying out my invention, I employ a pair of side plates 7 and 8, each of which is provided with a straight edge 9. These straight edges or strips are arranged to converge inward as shown in Figs. 4 and 5, and are adapted to engage dove-tail grooves 10 in the opposite sides of a brake shoe 11. The strip 9 of the inner side plate 7 is also provided with a small teat 12 on its inner side adapted to engage a corresponding recess or socket in the side of the brake shoe so as to prevent movement of the brake shoe relative to the side plates. At the inner edges of the straight strips 9, the side plates are provided with bosses 13 having angular openings 14 therethrough to receive a securing bolt 15, and the outer faces of these bosses are flat so as to permit a nut 16 to be turned home squarely in the bolt 15 and thereby draw the side plates together so as to firmly clamp and hold the brake shoe. The inner side plate 7 is further provided with bosses 17 at its upper and lower ends whereby countersunk recesses 18 are formed in the inner side of the said plate to receive the heads 19 of bolts 20 which pass through the ends 5 of the guide rod 3 and thereby secure the said guide rod to the brake block. As clearly shown in the drawings, the side plates are of a crescent shape and have their front edges of a segmental form.

At the centers of the front portions of the side plates are formed openings 21 to receive the end of the brake beam 1, and the inner side plate 7 is also provided with a hub 22 formed integral therewith and adapted to extend through the opening 21 in the outer side plate 8, as shown most clearly in Fig. 5. The hub 22 should be considerably longer than the combined thickness of the side plates so as to project beyond the outer side plate, as shown in Fig. 5, and consequently permit the outer side plate to be shifted longitudinally along the same so as to accommodate the device to brake shoes of different widths. The inner portions of the side plates are set in from the bosses 13, and on their extreme inner or front edges are provided the lateral inwardly-projecting teeth or lugs 23, the purpose of which will presently appear. The plates are reinforced and strengthened by means of ribs or flanges 24 on their inner faces and following the outline of their edges, and the outer side plate is further reinforced and strengthened by a rib or bridge 25 arranged around the central opening 21 thereof, as shown in Figs. 5 and 7. An adjusting ring 26 is mounted on the hub 22 between the side plates, and the said ring is provided with edges disposed at an angle to its diameter so that the ring will be wider at one side than at the opposite side, while in the edges of the said ring are provided notches 27 which may be engaged by the teeth 23 so as to secure the device in any position to which it may be adjusted.

In applying my improved brake block, the brake shoe of the proper width will be provided and the clamping plates will be brought into engagement with the sides of the same, as will be readily understood. The brake shoes are in three standard sizes in common use and the adjusting ring 26 will, therefore, have its notches 27 disposed at such points around its edges as to hold the side plates at such distances apart as will cause them to accommodate the shoes of these standard widths. It will be understood, however, that more notches may be provided and consequently a greater range of adjustment secured. Assuming that the smallest brake shoe is to be used, the ring 26 will be turned upon the hub 22 so as to bring its narrowest edge between the teeth 23, and the bolt 15 is then tightened so as to draw the teeth into engagement with the said notches and consequently clamp the side plates against the shoe. The guide rod may then be attached and the brake beam fitted, when the brake block will be ready for use. When the brake shoe is worn out and it is necessary to substitute a new one, the bolt 15 may be loosened sufficiently to permit the withdrawal of the old shoe and the substitution of a new one without making it necessary to disconnect the brake beam or the guide 3, as will be readily understood.

My device is extremely simple in its construction and operation, and its many advantages are thought to be manifest.

In Fig. 8, I have shown a slight modification whereby it is adapted to heavier and larger brakes used upon vehicles of greater capacity. This form of the invention is substantially the same as that shown in the other figures, but the side plates are relatively narrower and are provided with two bosses 13′ instead of the single boss 13 shown in the other figures, and these bosses 13′ are placed near the ends of the side plates so that a plurality of fastening bolts may be inserted therethrough to secure the side plates in clamping engagement with the brake shoe.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. In a brake block, the combination of a brake shoe, a pair of side plates adapted to engage the same, means for clamping the said side plates upon the shoe, and adjustable means independent of the clamping means and located between the said side plates for holding the said side plates in spaced relation and at different distances apart.

2. The combination of a brake shoe, side plates adapted to clamp the said shoe, a hub formed on one of said plates and extending loosely through an opening of the other plate and projecting beyond the same so as to allow for the adjustment of the plates within the limits of the length of the hub, means for securing the said plates together, and a brake beam fitted in the said hub.

3. The combination of a brake shoe, side plates adapted to clamp the same, means for securing the said side plates, a brake beam fitted in the front portions of said plates, and a tapered spacing ring fitted between the said plates whereby they may be secured at various distances apart.

4. The combination of a brake shoe, a pair of side plates adapted to clamp the said shoe, means for securing the said plates, inwardly-projecting teeth at the front edges of the said plates, and a tapered notched ring arranged between the said plates and having its notches arranged for engagement by the said teeth.

5. The combination of a brake shoe, a side plate fitting against one side of the shoe and having an integral laterally-projecting hub, a co-acting side plate fitting against the opposite side of the shoe and having an opening through which the hub is passed, means for clamping the side plates together, said hub being constructed to receive the brake beam, and adjustable means located between the side plates for spacing them at different distances apart.

6. The combination of a brake shoe, a side plate fitting against one side of the shoe and having a laterally-projecting hub in advance of the shoe, a co-acting side plate fitting against the opposite side of the shoe and having its front portion fitting around said hub, a spacing device mounted on the hub between the side plates, and means for securing the said plates together.

7. The combination of a brake shoe, a side plate fitting against one side of the shoe and having a laterally-projecting hub in advance of the shoe, a co-acting side plate fitting against the opposite side of the shoe and having its front portion fitting around said hub, a tapered spacing ring mounted on the hub between the side plates, and means for securing the said plates together.

8. The combination of a brake shoe, a side plate fitting against one side of the shoe and having a laterally-projecting hub in advance of the shoe, a co-acting side plate fitting against the opposite side of the shoe and having its front portion fitting around the said hub, inwardly-projecting teeth on the front edges of the side plates, a tapered spacing ring mounted on the hub between the side plates and provided in its edges with notches adapted to engage the inwardly-projecting teeth on said plates, and means for securing the said plates together.

9. The combination of a brake shoe, side plates adapted to clamp the said shoe, a hub formed on one of the said plates extending through the other plate, a tapered ring fitted on the hub and having an interlocking connection with the plates, means for securing the said plates, and a brake beam fitted in the said hub.

10. The combination of a brake shoe, side plates adapted to engage and clamp the brake shoe at their inner edges, a hub formed on one of the side plates and adapted to pass through an opening of the other side plate, said hub receiving the brake beam, a bolt connecting the side plates adjacent the brake shoe, and an adjusting device mounted on the hub and adapted to fit between the side plates to hold them apart.

11. The combination of a brake shoe, side plates adapted to engage the said shoe, one of said plates being provided with bosses at top and bottom whereby countersunk recesses are formed on the inner sides of the plates, bolts passed through the bosses and having their heads fitted in the said recesses, a guide bar having a forked end, the branches of which are fitted on the bolts against the said bosses, and nuts on the ends of the bolts.

12. The combination of a brake shoe, side plates adapted to embrace the same, a bolt connecting the said plates and provided with a nut for holding them in clamping relation, said plates having a hub through which the brake beam is passed, and an adjusting ring of tapered form fitted between the plates to hold them in spaced relation.

In testimony, that I claim the foregoing as my own, I have hereto affixed my signature in the presence of two witnesses.

GEORGE STEWARD MacLEOD.

Witnesses:
L. G. LINKLETTER,
WALTER SHAVE.

Copies of this patent may be obtained for five cents each, by addressing the "Commissioner of Patents, Washington, D. C."